Dec. 27, 1938.  G. E. DEY  2,141,265
DOOR HANDLE ROSE PLATE CONSTRUCTION
Original Filed April 19, 1937
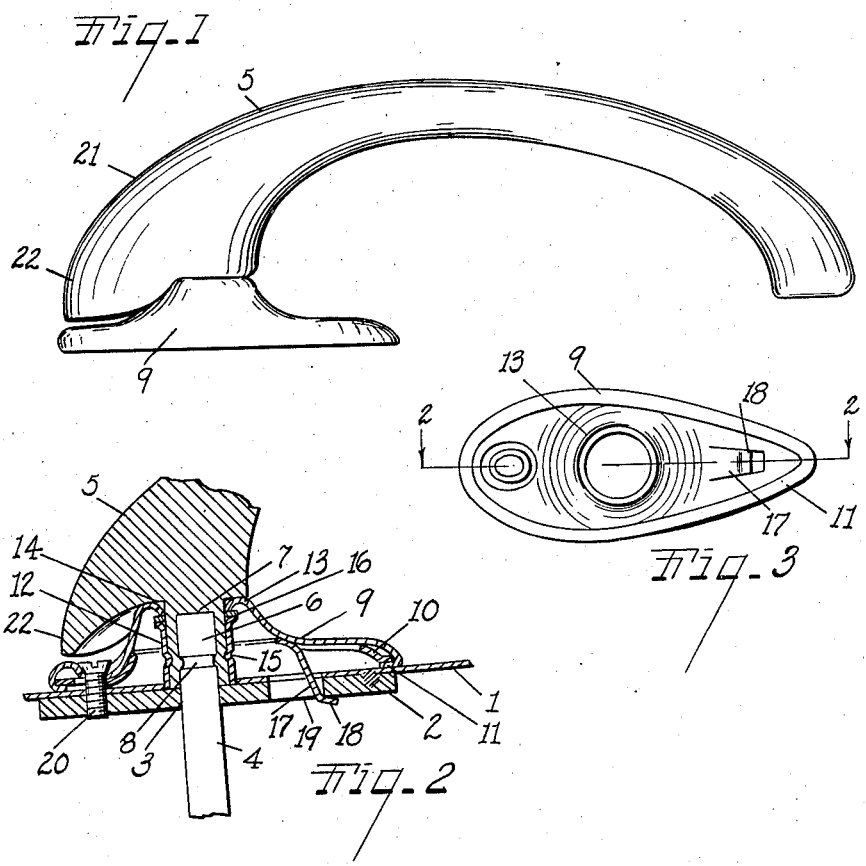
INVENTOR.
George E. Dey
BY
Earl F. Chappell
ATTORNEYS Patented Dec. 27, 1938

2,141,265

UNITED STATES PATENT OFFICE 2,141,265

DOOR HANDLE ROSE PLATE CONSTRUCTION

George E. Dey, Grand Rapids, Mich., assignor to W. B. Jarvis Company, Grand Rapids, Mich.

Original application April 19, 1937, Serial No. 137,672. Divided and this application January 31, 1938, Serial No. 187,796

5 Claims. (Cl. 292—357)

This application is a division of my application for Letters Patent filed April 19, 1937, Serial No. 137,672, for Door handle construction.

The main objects of this invention are:

First, to provide an improved escutcheon or rose plate member suitable for an automobile door handle and means for securing the same to the door panel.

Second, to provide a structure of this type in which the securing means are concealed and protected from tampering or removal when the handle is locked.

Third, to provide a structure of the type described having means for greatly simplifying the labor of mounting upon a door.

Objects relating to details and economies of the invention will appear from the description to follow. The invention is defined and pointed out in the claims.

A preferred embodiment of the invention is illustrated in the accompanying drawing, in which:

Fig. 1 is a view in elevation of a handle and escutcheon plate embodying the features of my invention.

Fig. 2 is a fragmentary view mainly in longitudinal section on line 2—2 of Fig. 3 showing the parts in mounted relation upon a door.

Fig. 3 is an inverted view of the escutcheon plate.

Referring to the accompanying drawing, 1 represents the panel or outer side of a door such, for example, as an automobile door having secured to the inner side thereof a reinforcing plate 2. This reinforcing plate is provided with a hole 3 rotatably receiving the spindle 4 of the handle 5. This handle 5 is provided with a stem portion 6 provided with a longitudinal bore 7 in which the spindle is secured by staking or upsetting a portion of the stem into the annual recess 8 provided in the spindle.

The escutcheon plate 9 is suitably conformed to receive the stem of the handle and embraces the back or base plate 10, the escutcheon plate having an inturned flange 11 spun around or folded around the edge of the back plate. The back plate is conformed in shape to the escutcheon and constitutes a reinforcing means therefor.

The escutcheon plate is secured to the stem of the handle by means of the sleeve 12 which clamps the inturned edge 13 of the escutcheon plate against the shoulder 14 at the base of the stem—see Fig. 2. This sleeve 12 is secured upon the stem by indentations 15.

A washer 16 is arranged between the edge of the inturned flange 14 and the upper edge of the sleeve which is outwardly flared to effectively support the washer.

The base plate 10 has a tongue 17 struck inwardly therefrom, the tongue being provided with a forwardly projecting lip or tip portion 18 which engages the edge of the hole 19 formed in the reinforcing plate 2 to receive the same.

At the end opposite the tongue 17, the escutcheon reinforcing or backing plate 10, the panel 1 and the reinforcing plate 2 are provided with aligned holes adapted to receive the attaching screw 20 which locks the escutcheon in position and coacts with the tongue 11 in resisting dislocating stresses.

The handle 5 is conformed to provide a continuous curve 21 on its outer side, the handle being extended into a heel portion 22 which overhangs the screw 20 and effectively prevents access to the screw 20 when the handle is locked.

I have not illustrated locking means as various means for locking door handles from the inside thereof are known to the art or industry. The portion 22 is an effective shield for the securing part.

I have illustrated and described my improvements in a practical embodiment thereof. I have not attempted to illustrate various modifications and adaptations as it is believed that this disclosure will enable those skilled in the art to embody or adapt my improvements as may be desired.

Having thus described my invention, what I claim as new and desire to secure by Letters Patent, is:

1. In a handle rose plate construction for attachment to an automobile door panel, a base plate having a tongue struck inwardly thereof, such panel having an aperture engageable by said tongue, and an escutcheon corresponding in shape to and abutting said base plate with the edges of the escutcheon flanged underneath the base plate, said escutcheon and base plate having aligned apertures receiving a securing bolt.

2. In an automobile door handle rose plate construction, an escutcheon, and a mounting plate for securing the same to a door panel, said mounting plate having a tongue struck inwardly therefrom and engageable in an aperture in the panel to locate and secure the plate to the door, said escutcheon and plate having aligned apertures to receive a securing bolt, said escutcheon surrounding said mounting plate and having an annular flange spun around the same between the mounting plate and the panel.

3. In an automobile door handle rose plate construction, an escutcheon, and a mounting plate for securing the same to a door panel, said mounting plate carrying means engageable in an aperture in the panel to locate and secure the plate to the door, said escutcheon and plate having aligned apertures to receive a securing bolt, said escutcheon surrounding said mounting plate and having an annular flange spun around the same between the mounting plate and the panel.

4. In an automobile door handle rose plate construction, an escutcheon, and a mounting plate for securing the same to a door panel, said mounting plate carrying means engageable in an aperture in the panel to locate and secure the plate to the door, said escutcheon surrounding said mounting plate and having an annular flange spun around the same between the mounting plate and the panel.

5. In an automobile door handle rose plate construction, an escutcheon, and a mounting plate for securing the same to a door panel, said mounting plate having a tongue struck inwardly therefrom and engageable in an aperture in the panel to locate and secure the plate to the door, said escutcheon and plate having aligned apertures to receive a securing bolt, and means for retaining said escutcheon and plate in assembled relation.

GEORGE E. DEY.